United States Patent
Tiffany et al.

(10) Patent No.: US 10,156,297 B2
(45) Date of Patent: Dec. 18, 2018

(54) SANITARY HIGH PRESSURE AERATOR VALVE ASSEMBLY

(71) Applicant: Control Concepts, Putnam, CT (US)

(72) Inventors: Henry D. Tiffany, Juneau, AK (US); Paul S. Rose, Sanibel, FL (US); Aaron G. Hall, North Grosvenordale, CT (US); Daniel S. Smith, Woodstock, CT (US)

(73) Assignee: Control Concepts, Inc., Putnam, CT (US)

( * ) Notice: Subject to any disclaimer, the term of this patent is extended or adjusted under 35 U.S.C. 154(b) by 0 days.

(21) Appl. No.: 15/603,329

(22) Filed: May 23, 2017

(65) Prior Publication Data

US 2018/0073659 A1 Mar. 15, 2018

Related U.S. Application Data

(63) Continuation-in-part of application No. 15/261,634, filed on Sep. 9, 2016, now Pat. No. 9,765,902.

(51) Int. Cl.
| | |
|---|---|
| *F16K 15/02* | (2006.01) |
| *F16K 31/122* | (2006.01) |
| *B65D 88/72* | (2006.01) |
| *F16K 15/06* | (2006.01) |

(52) U.S. Cl.
CPC .......... *F16K 31/1221* (2013.01); *B65D 88/72* (2013.01); *F16K 15/063* (2013.01)

(58) Field of Classification Search
CPC ........................... F16K 31/1221; F16K 15/063
USPC ................................. 137/535, 540, 541, 542
See application file for complete search history.

(56) References Cited

U.S. PATENT DOCUMENTS

| | | | | |
|---|---|---|---|---|
| 754,569 | A * | 3/1904 | Jones ..................... | F16K 15/063 137/536 |
| 1,001,846 | A * | 8/1911 | Harley ................. | F16K 17/0433 123/90.14 |
| 1,319,404 | A * | 10/1919 | McGuire ............. | F16K 31/1221 251/63.5 |
| 2,820,474 | A * | 1/1958 | Greenwood .............. | F16K 1/34 137/536 |
| 3,550,625 | A * | 12/1970 | Adams, Jr. .............. | F16K 27/02 137/454.5 |

* cited by examiner

*Primary Examiner* — Craig Schneider
*Assistant Examiner* — P. Macade Nichols (57) ABSTRACT

A sanitary high pressure valve assembly is provided. The valve assembly includes an inlet adaptor for admitting pressurized gas into a sanitary central passageway for release into a storage vessel containing granular material for the purpose of aiding flow of the granular material from the storage vessel. The valve assembly also includes an isolation chamber for housing serviceable parts that are isolated from the sanitary central passageway.

15 Claims, 12 Drawing Sheets

SANITARY HIGH PRESSURE AERATOR VALVE ASSEMBLY

CROSS-REFERENCE TO RELATED APPLICATIONS

The present application is related to, claims the earliest available effective filing date(s) from (e.g., claims earliest available priority dates for other than provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

This application is a continuation-in-part of pending application Ser. No. 15/261,634, filed 9 Sep. 2016 entitled "Sanitary High Pressure Aerator Valve".

BACKGROUND

1. Field of Use

This invention relates generally to a valve construction for releasing a relatively large volume of pressurized gas into a storage vessel containing granular material and the like for the purpose of accelerating the flow of said granular material therefrom and more particularly to modifying such valve construction for improved operation.

2. Description of Prior Art (Background)

Discharging particulate material from an opening in a storage vessel is sometimes troublesome because of clogging, bridging, rat-holing or sticky build-up of the particulate material on the vessel walls, which can occur anywhere in the vessel but usually occurs near the discharge outlet of the vessel. This clogging is often aggravated when the particulate material is moist or contains additives that make it sticky. Numerous attempts have been made in the past to alleviate this problem. For example, it has been proposed to mount one or more gas discharge devices on the vessel walls or sloping sides of hoppers containing particulate material. Such discharge aid devices have a nozzle extending into the hopper for directing a blast of gas into the hopper to reduce clogging and bridging of the material contents so that the material can be discharged by conventional gravity or to assist other unloading equipment as disclosed in U.S. Pat. No. 3,788,527. While such prior art discharge aid devices, such as air blasters or air pulsing, have met with varying degrees of commercial success, the devices all have open discharge ends which are subjected to particulate material and fines entering into the devices via said openings and fouling the internal mechanisms and rendering the devices partially or completely inoperative. This shortcoming of the prior art devices necessitates shutdowns for costly repair, cleaning and loss of production.

Also by the nature of construction for said prior art devices, close tolerances of the internal piston member to the surrounding outer housing are necessary for these air blasters to operate efficiently. This creates a problem where temperature changes in the surrounding environment can cause binding between parts having different thermal expansion coefficients, thereby causing eventual operational failure. These temperature variations can be seasonal or daily, caused by changing environmental conditions, or created by the industrial processes involved.

A related serious problem occurring with operation of these prior art valve constructions is that of contaminating the stored particulate material with metal pieces derived from the valve itself or its mounting plate, such as weldment bits.

An aerator valve of this type now in wide commercial use has also been developed having fewer moving parts than disclosed in the aforementioned prior art patent. Unfortunately, said modified valve construction still remains prone to much of the above noted operational difficulties attributable at least in part to having critical components fabricated with weldments. Basically, said modified valve construction includes an outer housing with front and back ends terminating a central inner passageway, a movable piston member slidably engaged within the central passageway in said outer housing, a spring loaded piston guide member affixed within the central passageway in said outer housing intermediate the front and back ends, and a pneumatic valve mechanism supplying a pressurized gas medium to drive the piston member forward unseating the front end of said passageway and releasing the pressurized gas to the surrounding atmosphere. In constructing said commercial valve device, the piston member is designed with an enlarged head termination sealing the front end of the central passageway and with said member having been formed with multiple component parts joined together by conventional welds. More particularly, a machined rod is employed which is threaded into and welded to a separate enlarged head portion of said member and with the enlarged head portion further terminating with a welded end cap. Still further welding of a metal compression spring to the spring loaded piston guide member employed in said valve construction occasions frequent device failure during valve operation accompanied by introducing weld fragments into the storage vessel where employed.

To overcome the aforesaid operational difficulties with this type valve device, there is now provided an improved pneumatic powered gas discharge valve construction having few internal parts and which can still further be affixed to assorted storage vessels in an improved manner. In doing so, the present valve device can be connected to a high flow pulse type electric solenoid valve for installation on one or more storage vessel side walls to direct repeated pulses of the pressurized gas medium being released between the particulate material being stored and the inner vessel wall. Multiple installations of the presently improved valve device are contemplated with individual valves being equally spaced about the side walls of said storage vessel when desired. Affixing of the presently improved valve construction to a storage vessel side wall or multiple side walls has also been simplified for cost reduction and required maintenance or valve removal. More particularly, the prior art valve installations customarily employ a flat mounting plate coupled to another flat mounting flange in order to physically secure the valve device to the vessel side wall and with the vessel side wall often having a curved contour requiring considerable welding to accomplish such manner of joinder. As distinct therefrom, the presently improved valve construction enables joinder of said valve device to the vessel side wall with a novel weld-on mounting collar.

It is an object of the present invention, therefore, to provide an operationally improved gas powered discharge aid device having fewer non-welded internal working parts.

It is another object of the present invention to provide said presently improved gas discharge device in a manner requiring only a relatively simple modification of the component parts.

A still further object of the present invention is to provide improved means whereby the presently improved gas discharge device can be physically secured to the side walls of a storage vessel.

It is yet another object of the present invention to provide a novel cooperation between the presently improved gas discharge device and the mounting means whereby said device can be physically secured to a storage vessel side wall.

These and still further objects of the present invention will become apparent upon considering the following detailed description of the present invention.

BRIEF SUMMARY

The invention is directed towards a sanitary high pressure aerator valve assembly. The sanitary high pressure aerator valve assembly includes a main body having substantially collinear opposite ends; a coupling collar attachable one end of the main body; an end cap attachable to an end opposite of the coupling collar end; and an inlet adaptor attachable to the main body, wherein the inlet adaptor is substantially perpendicular with the substantially collinear opposite ends. The main body also includes a sanitary central inner passageway for introducing pressurized gas into a vessel when the pressurized gas is sufficient to overcome a compression spring holding a piston head in a closed position. Additionally, the assembly includes an isolation chamber for housing serviceable parts and is isolated from the sanitary central passageway.

The invention is also directed towards a sanitary high pressure aerator valve assembly having a main body having substantially coaxial opposite ends. A coupling collar is attachable to one end of the substantially coaxial opposite ends and an end cap is attachable to the end opposite of the coupling collar end. In addition, an inlet adaptor is attachable to the main body, wherein the inlet adaptor is substantially perpendicular to the substantially coaxial opposite ends. The sanitary high pressure aerator valve assembly also includes an air chamber comprising a central passageway disposed between the inlet adaptor and the coupling collar end; and there are no non-aerodynamic parts disposed within the central passageway which may be prone to capturing material.

In accordance with another embodiment of the present invention a sanitary high pressure aerator valve assembly is provided. The sanitary high pressure aerator valve assembly includes a main body having a circular outlet port, a cap end; and an inlet port. An air chamber comprising a central passageway is disposed between the inlet port and the outlet port; and wherein there are no non-aerodynamic parts disposed within the central passageway which might trap material (e.g., organic material). The sanitary high pressure aerator valve assembly includes an air chamber isolation assembly for isolating the central passageway from the cap end. The sanitary high pressure aerator valve assembly also includes a one-piece unitary piston member slidable for a predetermined distance within a portion of the central passageway coaxial with the main body coaxial ends. The one-piece unitary piston member includes an enlarged head disposed at one end of the one-piece unitary piston member for sealing the coupling collar end of the air chamber; and a threaded length end disposed at an end opposite the enlarged head end; and wherein the threaded end is isolated from the central passageway by the air chamber isolation assembly.

The invention is also directed towards high pressure aerator valve having a nose end having an internal air flow chamber and a main body having an internal air flow chamber. The nose end and the main body air flow chambers are mateable to provide a continuous air flow chamber through the main body and the nose end. The high-pressure aerator valve also includes a rear body mateable to the main body and an end cap mateable to the rear body. A wiper seal is disposed between the main body and the rear body. The rear body, end cap and wiper seal form an air isolation chamber isolated from the air flow chamber during operation.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic.

Figure 1:
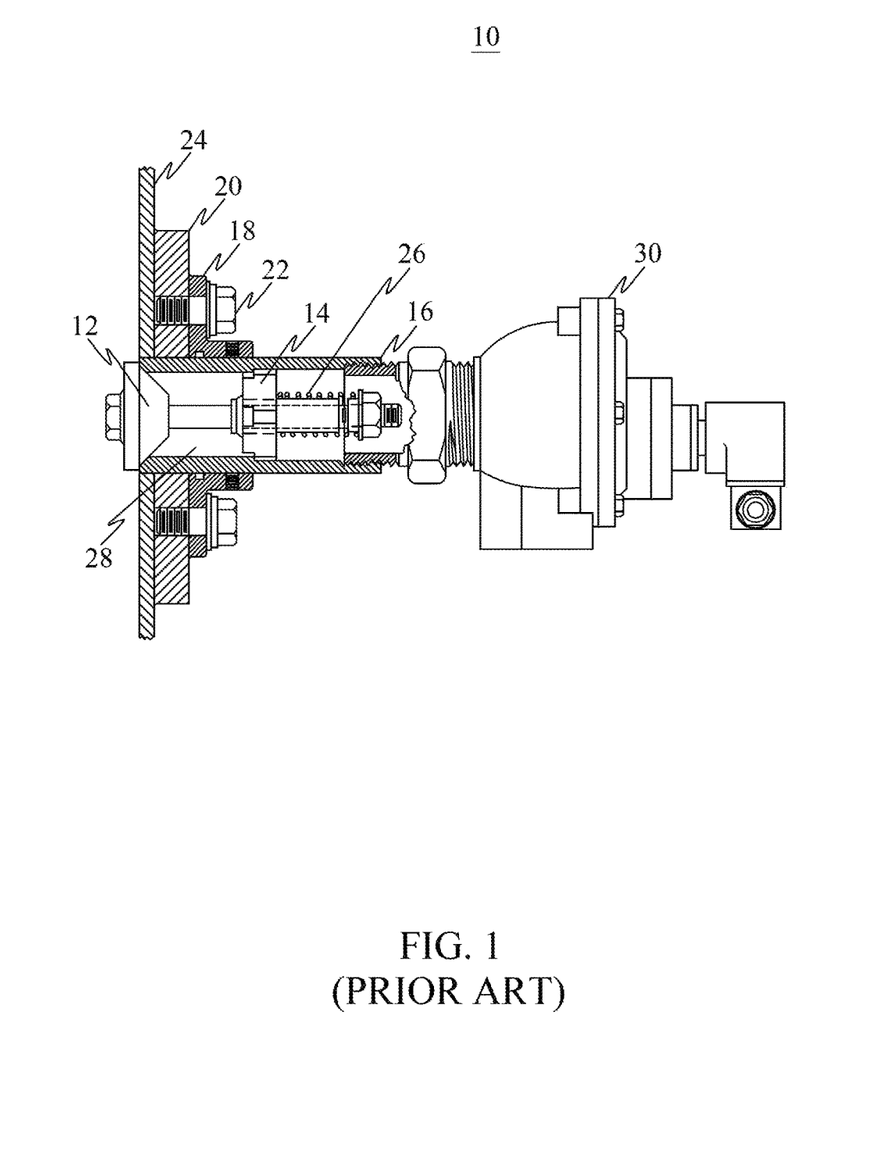
FIG. 1 is a side view partially in cross section for the previously described prior art gas powered discharge valve.

Referring now to FIG. 1 of the drawings, there is shown a side view partially in cross section for the previously described prior art gas powered discharge valve 10 now in commercial use. As can be noted, the depicted valve construction employs a multi-part metal piston member 12 as well as a multi-part metal piston guide member 14 and with both of the component parts having been fabricated with weldments as also formerly pointed out. The cylindrical valve construction further includes outer metal housing 16 which has been physically secured to a metal flange 18 that in turn has been fastened to metal mounting plate member 20 with conventional threaded bolts 22. As further shown in the present drawing, mounting plate member 20 has been affixed to storage vessel side wall 24 with additional weldments. A compression spring 26 disposed against the back end of piston guide member 14 keeps the valve closed until actuated by an admission of a pressurized gas to the hollow central passageway 28 of the valve construction. A conventional electric solenoid valve mechanism 30 supplies a pressurized gas medium, such as air and the like, to the back end of the central passageway to drive piston member 12 forward unsealing the front end of the passageway and releasing the pressurized gas to the interior of the storage vessel. For operation, the solenoid valve mechanism 30 can be attached to a compressed air supply line (not shown) and when pulsed normally for a ¼+L second time duration at gas pressures in the 40-100 psi range, the compression spring 26 is overcome and piston member 12 moves forward opening the discharge valve and releasing the pressurized gas in a full circle direction. Upon pulse termination, the internal spring member 26 immediately reseats the piston member blocking, mostly, any entry of granular material from the storage vessel into the inner valve body. Of particular note in the prior art device 10 is the flow of the pressurized gas is from the rear of the device thus requiring an open-air channel from the rear of the device to the discharge valve opening. It can be appreciated that any particulate matter caught in the crevices of, for example, spring member 26, is likely to be blown into, and contaminate a storage vessel.

Figure 2:
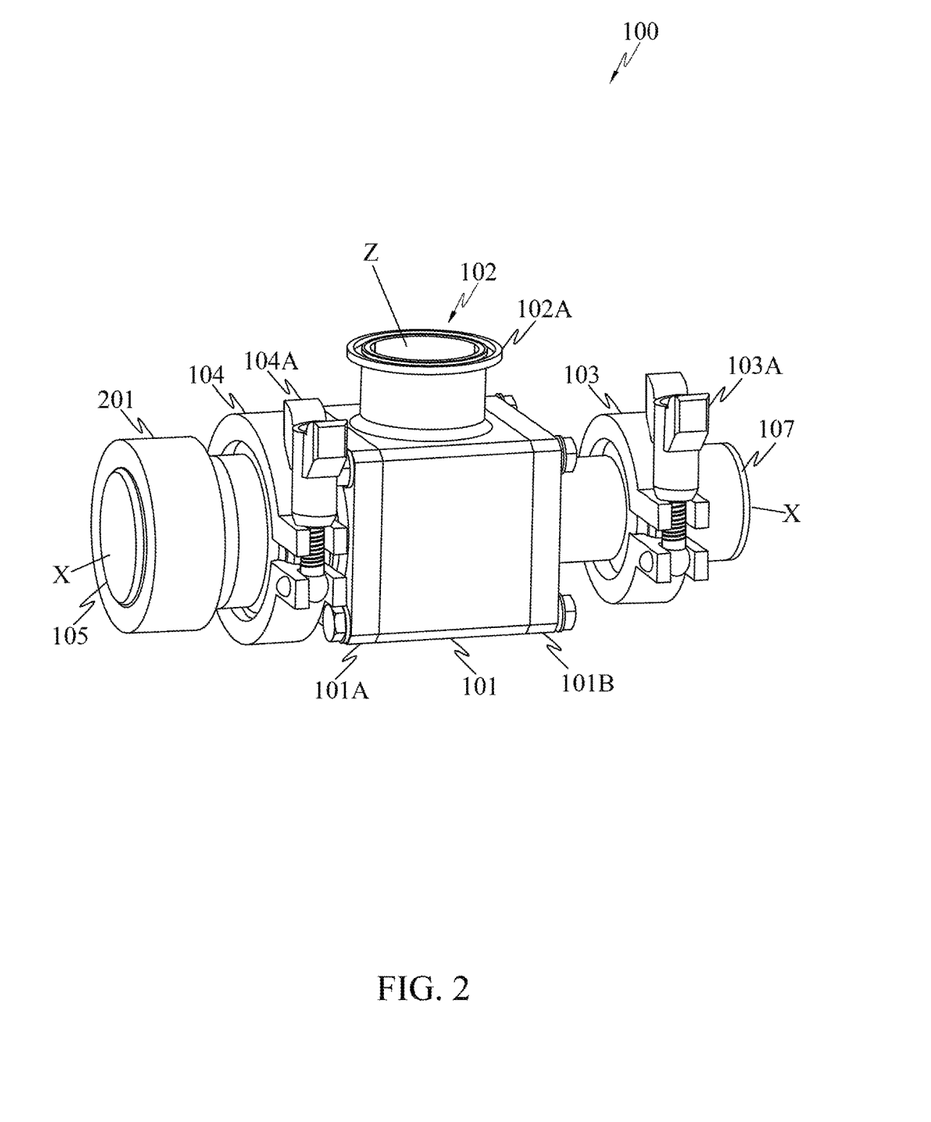
FIG. 2 is a perspective view of a sanitary high pressure aerator valve assembly in accordance with the present invention.

Referring also to FIG. 2 there is shown a perspective view of a sanitary high pressure aerator valve assembly 100 with valve head 105 in closed position. Shown in FIG. 2 is main body 101, inlet 102, end cap clamp 103, end clamp wing nut 103A, collar clamp 104, and collar clamp wing nut 104A. Also, shown in FIG. 2 is enlarged piston head 105.

Still referring to FIG. 2 it will be appreciated that inlet adapter 102 axis z is substantially perpendicular and coplanar to x-x axis of the high-pressure aerator 100. Couplings, such as elbow couplings, (not shown) to inlet adapter 102 can be rotated for convenient positioning of solenoid valve (not shown), facilitating efficient maintenance of aerator 100 units, particularly those installed where accessibility is problematic, e.g., at higher elevations on a vessel, as well as provide greater installation flexibility with respect to the placement of air hoses. Inlet adaptor 102 also includes a sanitary connection flange such as a standard tri-clover flange 102A.

Also, shown in FIG. 2 are quick release clamps 103, 104 and associated wing nuts 103A, 104A, which allow for a simplified installation and removal of the aerator valve 100. It will be appreciated that this feature is an advantage over prior art solutions which are often screwed into a threaded mounting coupling and tightened with lock nuts; thus requiring hand tools to install and remove aerator valve 100. Quick release clamps 103, 104 may be any suitable type of sanitary clamps such as, for example, tri-clover clamp assemblies.

End cap 107 is affixed to rear body 101 via quick release clamp 103. Quick release clamp 103 allows end cap 107 to be quickly and easily installation and removal for access to removable parts for servicing. It will be appreciated the novel feature disclosed herein is advantageous over prior art designs, such as shown in FIG. 1, which require use of tools and multiple steps to remove and repair an aerator valve.

Figure 2A:
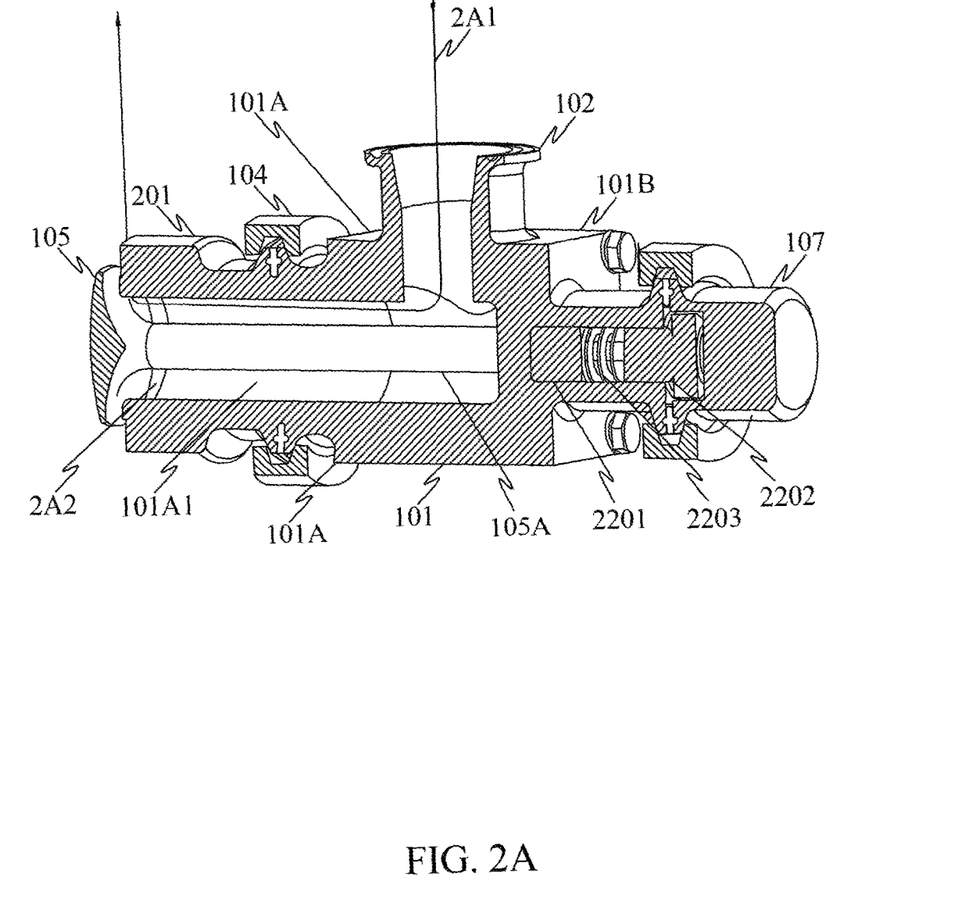
FIG. 2A is a partial cross sectional perspective view of the sanitary high pressure showing the piston valve in an open position and airflow through the sanitary high pressure aerator valve assembly in accordance with the present invention shown in FIG. 2.

Referring also to FIG. 2A there is shown a partial cross sectional perspective view of the sanitary high pressure showing the piston valve head 105 in an open position and airflow through the sanitary high pressure aerator valve assembly 100 in accordance with the present invention shown in FIG. 2. As will be described in more detail herein airflow along path 2A1 enters via inlet port 102, travels along chamber 101A1; and if sufficient pressure to overcome the wave spring 2203 restoring force the piston head 105 is force open allowing pressurized air to escape via gap 2A2. When the pressurized air is removed or insufficient to overcome the wave spring 2203 restoring force the wave spring pushes on bushing 2202, adjacent to washer 2204 adjacent to spring tensioner 2205 connected to piston valve shaft 105A forcing the piston valve head 105 to a closed position, i.e., there is no longer a gap 2A2 for air to escape chamber 101A. It will be appreciated that any suitable restoring force may be employed, such as, for example, wave springs or coil springs.

Figure 3:
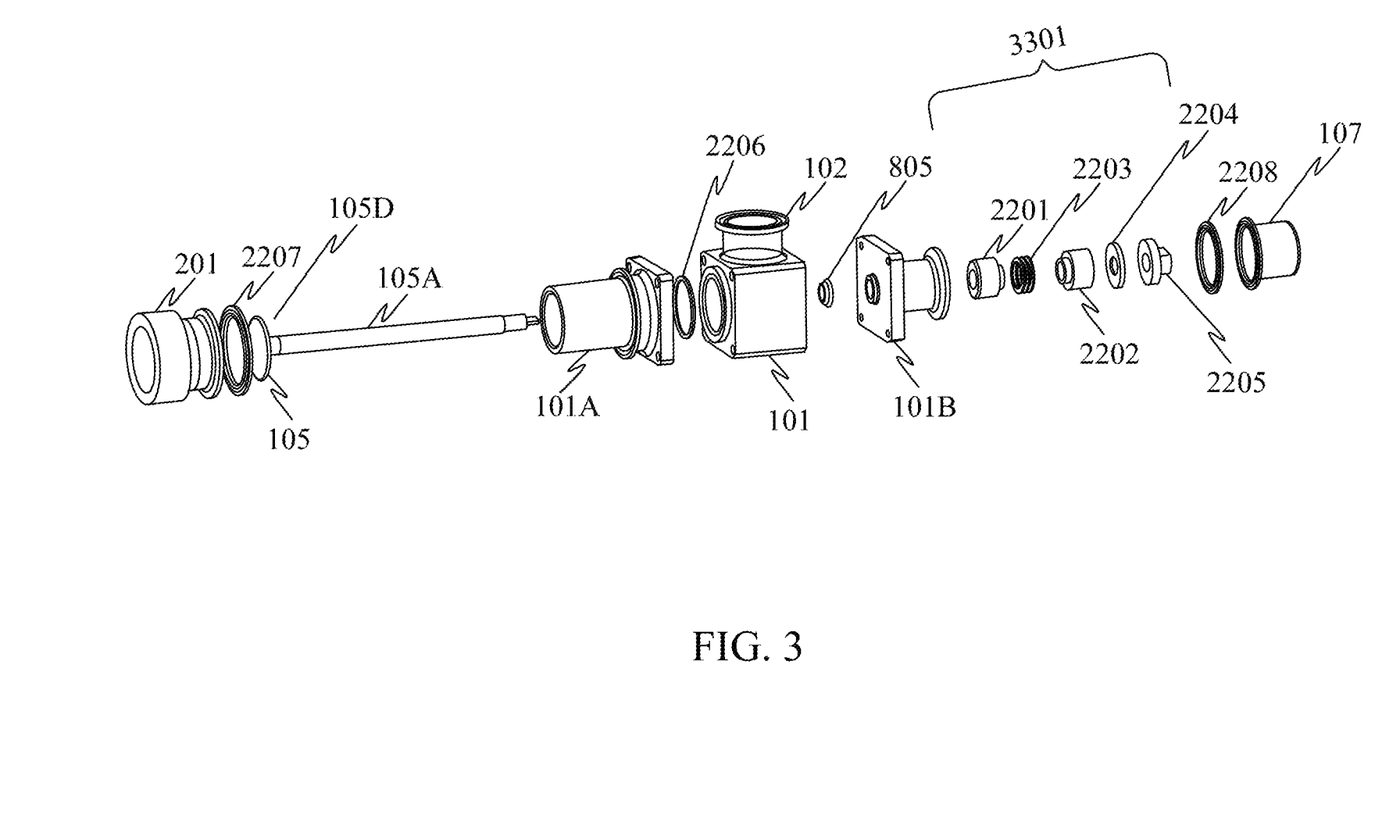
FIG. 3 is an exploded view of the sanitary high pressure aerator valve assembly in accordance with the present invention shown in FIG. 2.

Referring also to FIG. 3 there is shown an exploded view of the sanitary high pressure aerator valve assembly in accordance with the present invention shown in FIG. 2. Shown in FIG. 3 is weld-on mounting collar 201. In practice, mounting collar 201 is welded to any holding vessel or equipment having metal walls. The nose end 101A, attached to main body 101 is inserted through the mounting collar 201 and coupled together with mounting collar and gasket 2207 via collar clamp 104 and collar clamp wing nut 104A (shown in FIG. 2). In alternate embodiments mounting collar 201 may include a mounting flange. It will be appreciated that mounting collar 201 (with or without a mounting flange) may be affixed to vessel walls via any suitable means, for example, suitable adhesives or fasteners. It will also be understood that mounting collar 201 may be internally threaded for alternate coupling means.

Still referring to FIG. 3, nose end 101A is fitted to main body 101. Gasket 2206 helps ensure an airtight seal between main body 101 and nose end 101A. The rear body 101B is fitted to main body 101. Wiper seal 805 is sandwiched between the rear body 101B and main body 101 and is fitted to piston shaft 105A to form an air tight seal while allowing slidable movement of the piston shaft 105A through wiper seal 805. It will be appreciated that wiper seal 805 and rear body 101B isolate the interior air chamber (FIG. 5:4401) of the main body 101 from the restoring force end 3301 of the aerator valve 100.

Still referring to FIG. 3, wave spring 2203 is sandwiched between bushing 2201 and bushing 2202. The piston shaft 105A is slideable through bushings 2201, 2202 and wave spring 2203 and connected to tensioner 2205. Tensioner 2205 may be internally threaded and connected to piston shaft 105A via mated threads on piston shaft 105A (see FIG. 8:105B). In an alternate embodiment, tensioner 2205 may be pinned to piston shaft 10A with pin (FIG. 9:2205A) through piston shaft hole 105C (FIG. 9:105C). It will be appreciated that tensioner 2205 may be connected to piston shaft 105A by mateable threads and pin. It will also be appreciated that in alternate embodiments, bushing 2202, washer 2204 and tensioner 2205 may be a single unitary piece.

Still referring to FIG. 3, it will be understood that wave spring 2203 provides a restoring force against bushing 2202 which, pushes against washer 2204 abutted against tensioner 2205 attached to piston shaft 105SA, thus closing, or abutting, the piston valve head underside 105D of piston valve head 105 against nose end 101A. It will be understood that pressurized fluid (e.g., air) entering the main body 101 through inlet 102 pushes against piston valve head underside 105D and sufficient pressure to overcome wave spring 2203 force will slide the piston shaft 105A to an open position, allowing the pressurized fluid (e.g., air) to escape around the edge of the piston valve head 105. When the pressurized fluid is removed or insufficient to overcome the wave spring 2203 restoring force, the wave spring operates to return the valve head 105 to its closed position, i.e., the underside 105D of the valve head 105 abutted against nose end 101A.

Figure 4:
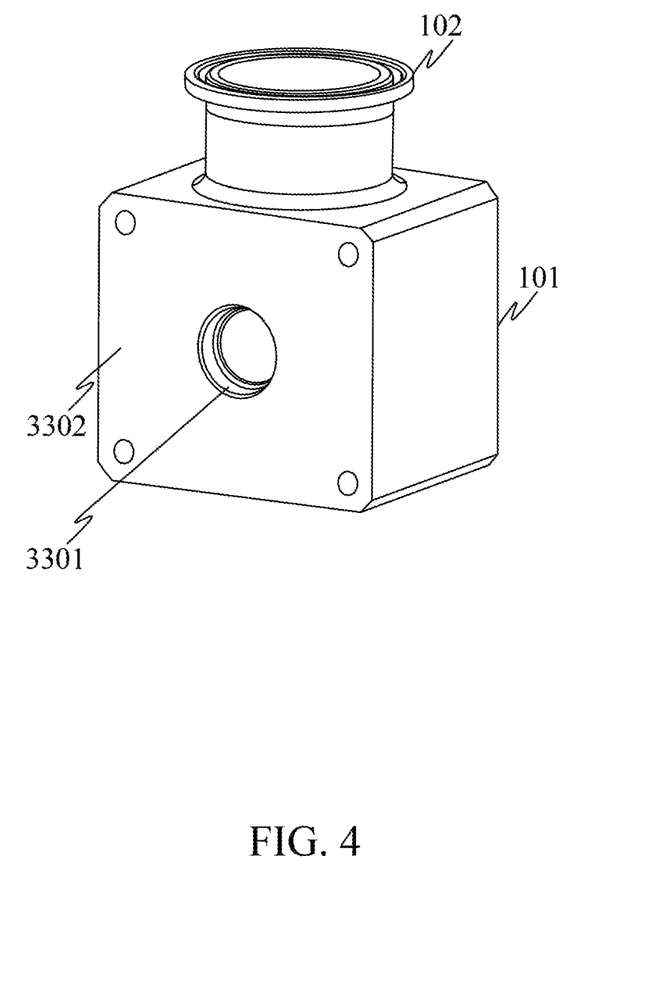
FIG. 4 is a perspective view of the main body in accordance with the invention shown in FIG. 2.

Referring also to FIG. 4 thee is shown is perspective view of the main body 101 in accordance with the invention shown in FIG. 2. FIG. 4 shows the mating face 3302 which is mated with rear body 101B. FIG. 4 also shows the wiper seal insert area 3301 where wiper seal 805 is fitted.

Figure 5:
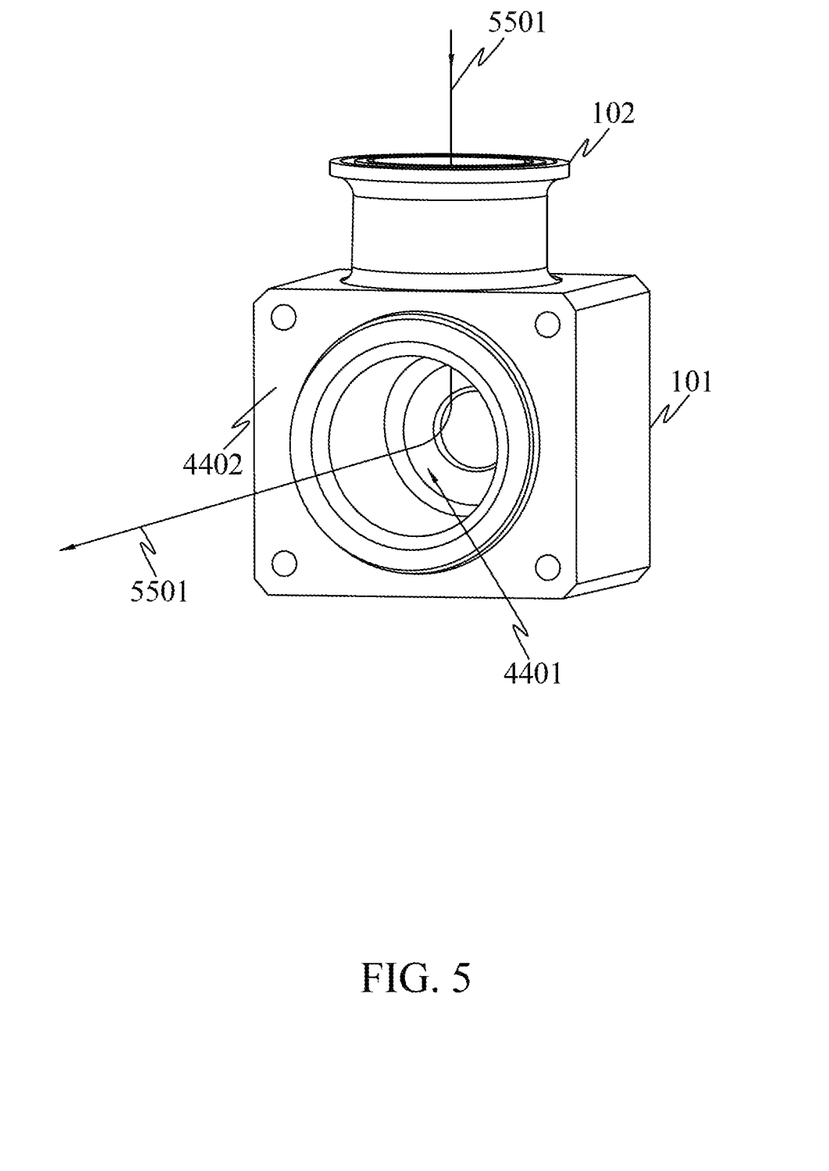
FIG. 5 is a nose perspective view of the main body in accordance with the invention shown in FIG. 2.

Referring also to FIG. 5 there is shown a nose perspective view of the main body 101 in accordance with the invention shown in FIG. 2. FIG. 5 shows the mating face 4402 which is mated with nose end 101A. FIG. 5 also shows air flow path 5501 through inlet 102 and exiting main body 101. It will be appreciated that in operation pressurized air along air flow path 5501 exiting main body 101 would enter nose end 101A to push against underside 105D of valve head 105.

Figure 6:
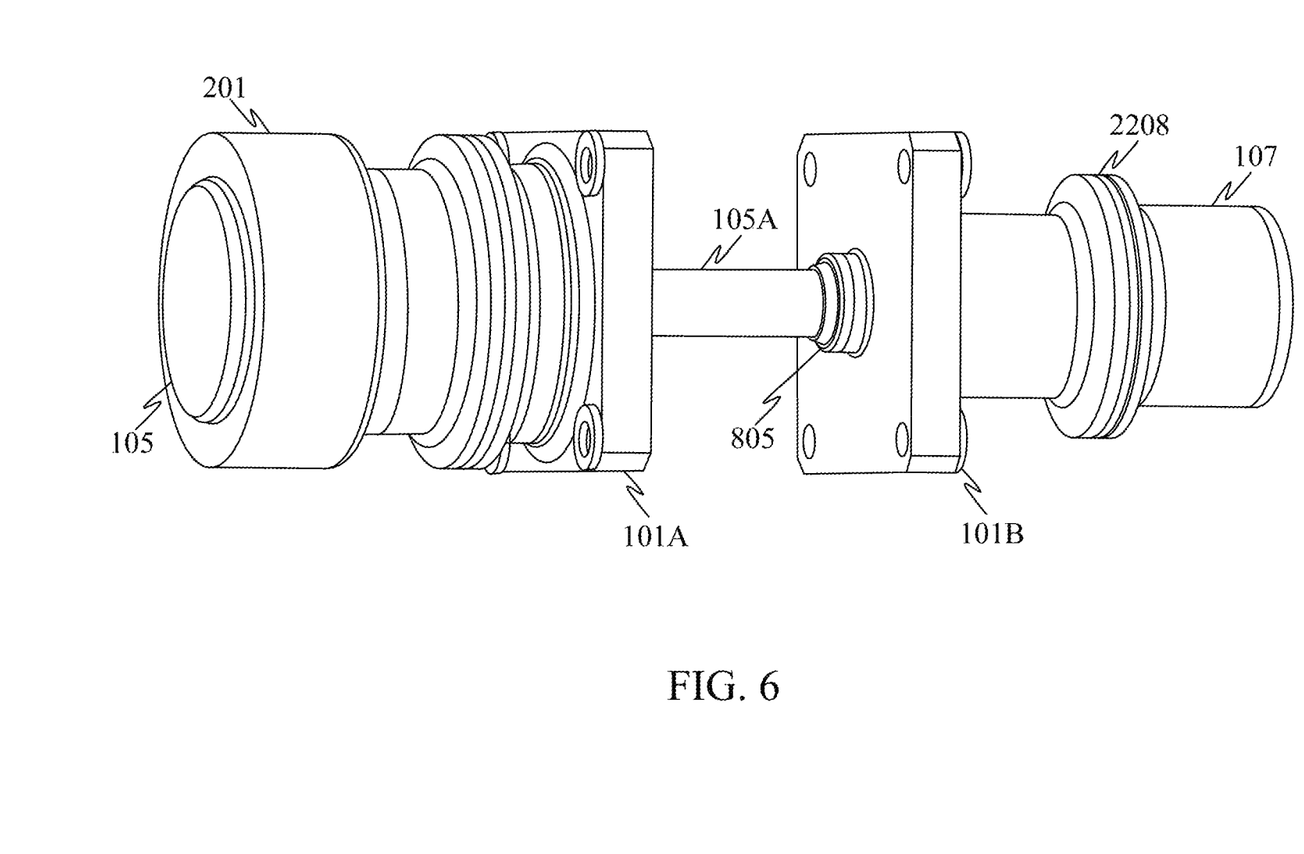
FIG. 6 is a partial assembly cap end perspective view of the sanitary high pressure aerator valve assembly in accordance with the present invention shown in FIG. 2.

Referring also to FIG. 6 there is shown a partial assembly cap end perspective view of the sanitary high pressure aerator valve assembly 100 in accordance with the present invention shown in FIG. 2. Wiper seal 805 is abutted against rear body 101B to isolate restoring force section 3301 from main body air chamber (See FIG. 5) and allow slidable operation of piston shaft 105A. Also shown in FIG. 6 is the rear body 101B, gasket 2208 and end cap 107 mated together to form an isolated chamber housing the restoring force section 3301.

Figure 7:
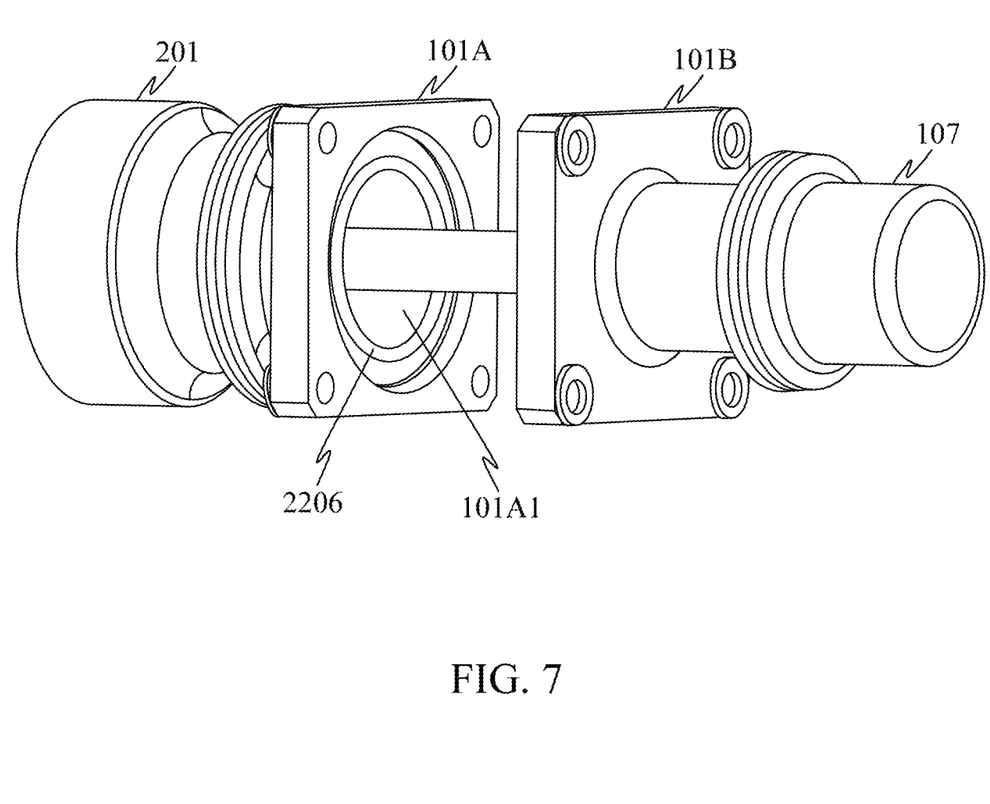
FIG. 7 is a partial assembly nose end perspective view of the sanitary high pressure aerator valve assembly in accordance with the present invention shown in FIG. 2.

Referring also FIG. 7 there is shown a partial assembly nose end perspective view of the sanitary high pressure aerator valve assembly 100 in accordance with the present invention shown in FIG. 2. Shown in FIG. 7 is interior air chamber 101A1 and gasket 2206. Gasket 2206 is mated against main body 101 to form an airtight seal between nose end 101A and main body 101. It will be understood that air flow 5501 exiting main body (See FIG. 5) enters into air chamber 10A1.

Figure 8:
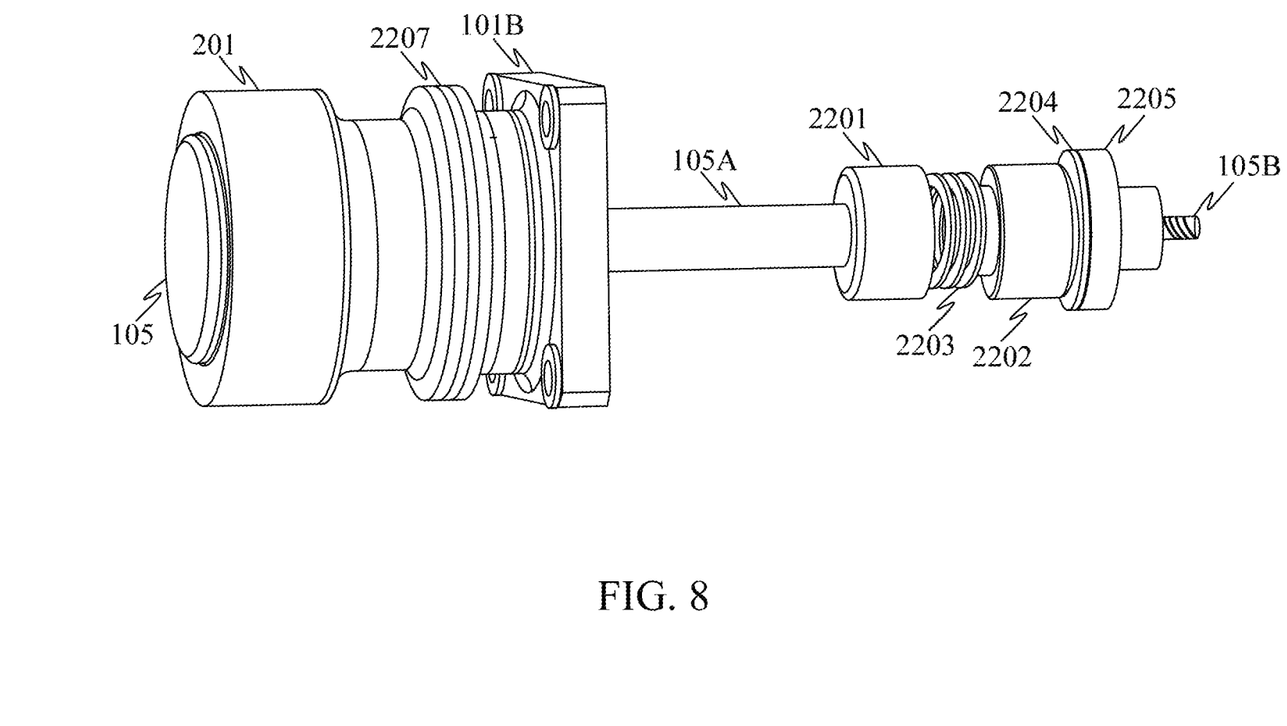
FIG. 8 is a partial assembly perspective view of the sanitary high pressure aerator valve assembly in accordance with the present invention shown in FIG. 2.
Figure 9:
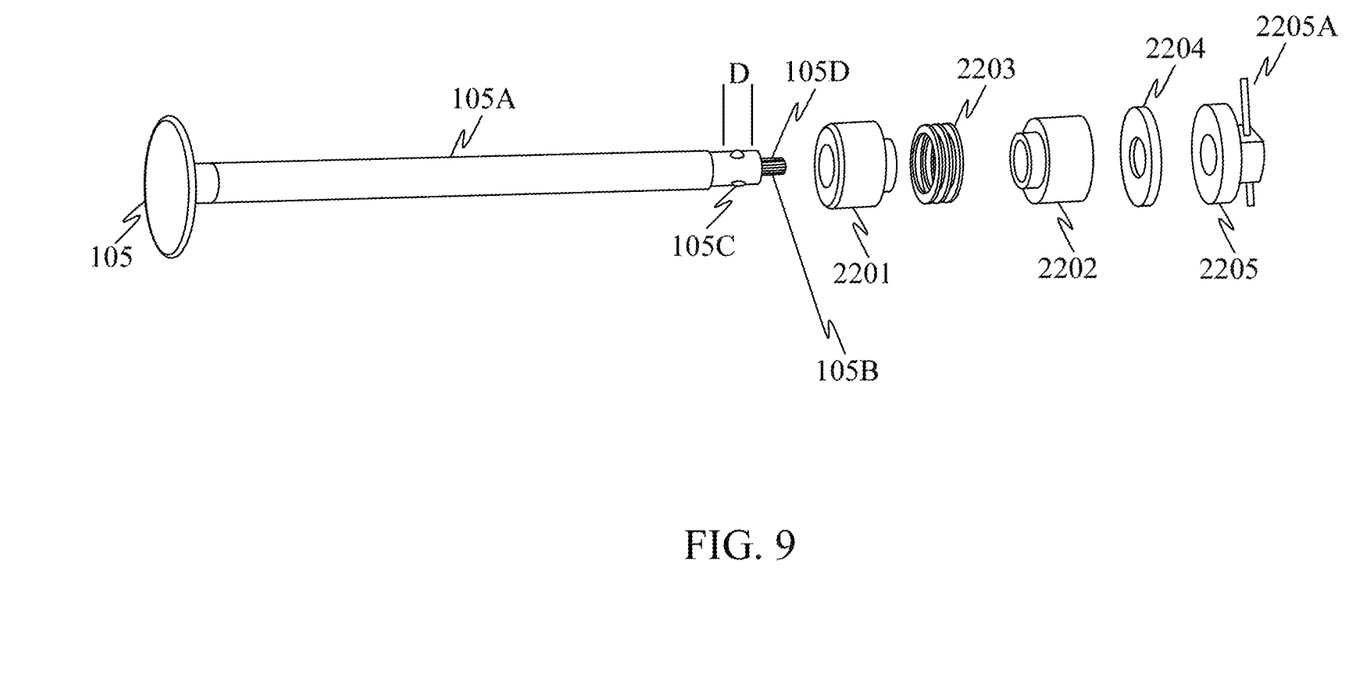
FIG. 9 is a partial exploded view of the piston assembly valve in accordance with the present invention shown in FIG. 2.

Referring also to FIG. 8 there is shown a partial assembly perspective view of the sanitary high pressure aerator valve assembly 100 in accordance with the present invention shown in FIG. 2. FIG. 8 shows the relative positions of bushings 2201, 2202, wave spring 2203, washer 2204, and tensioner 2205 on threaded valve shaft 105B. Tension adjuster 2205 adjusts tension applied to piston 105 by compression spring 2203. Tension adjuster 2205 may be any suitable tension adjuster such as a castellated or slotted nut.

Figure 8A:
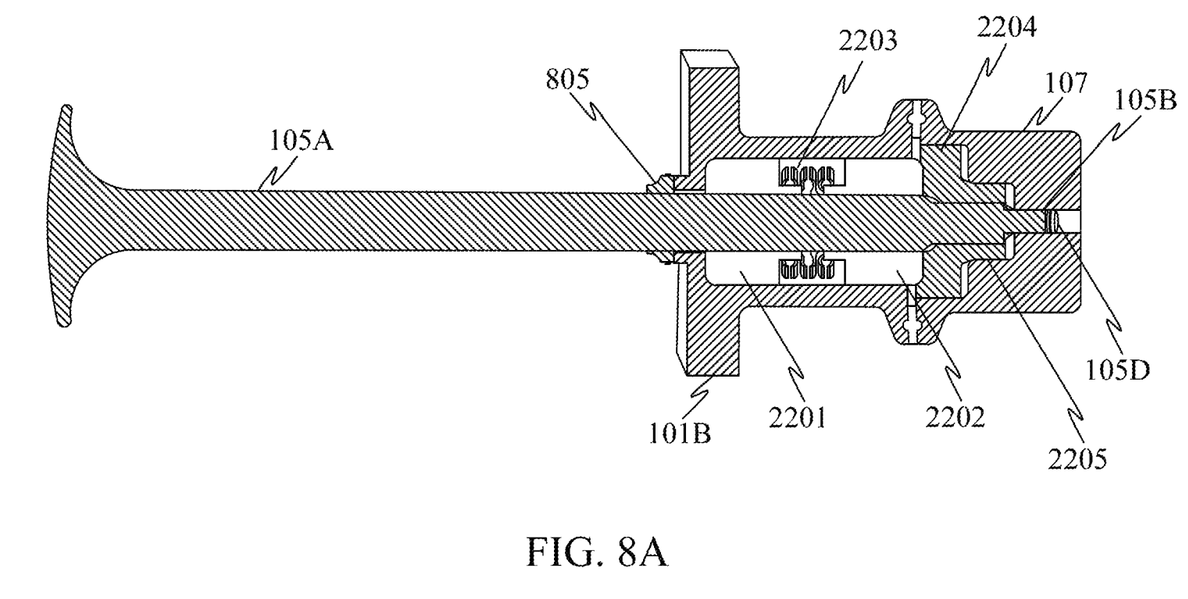
FIG. 8A is a partial cross section assembly perspective view of the sanitary high pressure aerator valve assembly showing in particular the isolated air chamber formed by the end cap, the rear body, the wiper seal, and the piston shaft, in accordance with the present invention shown in FIG. 2.

Referring also to FIG. 8A there is shown a partial cross section assembly perspective view of the sanitary high pressure aerator valve assembly showing in particular the isolated air chamber formed by the end cap 107, the rear body 101B, the wiper seal 805, and the piston shaft 105A, in accordance with the present invention shown in FIG. 2. It will be appreciated that bushing 2201, wave spring 2203, bushing 2202, and tensioner 2205 are contained within the isolated air chamber formed by aforementioned elements.

Referring also to FIG. 9 there is shown a partial exploded view of the piston assembly valve in accordance with the present invention shown in FIG. 2. Tension spring pin hole 105B location on metal piston 105A is predetermined for desired spring tension when tension adjuster 2205 is adjusted such that tension spring hole 105 is visible. It will be further understood that the location of tension spring hole 105B is predetermined as a function of the desired spring constant associated with spring 2203, and expected air pressure. For example, the hole 105B can be located on piston 105A such that the distance D is 0.125 inches for a given, or predetermined, spring constant associated with compression spring 803 and expected air pressure. Similarly, slotted tensioner 1201 may be turned on piston 105A threads 105B (See FIG. 8) until the tensioner 2205 bottoms out at the end of the threads 105B. The end of the threads, or thread length, 105B may be predetermined such that the distance D is 0.093 inches for a given spring constant and air pressure.

Figure 10:
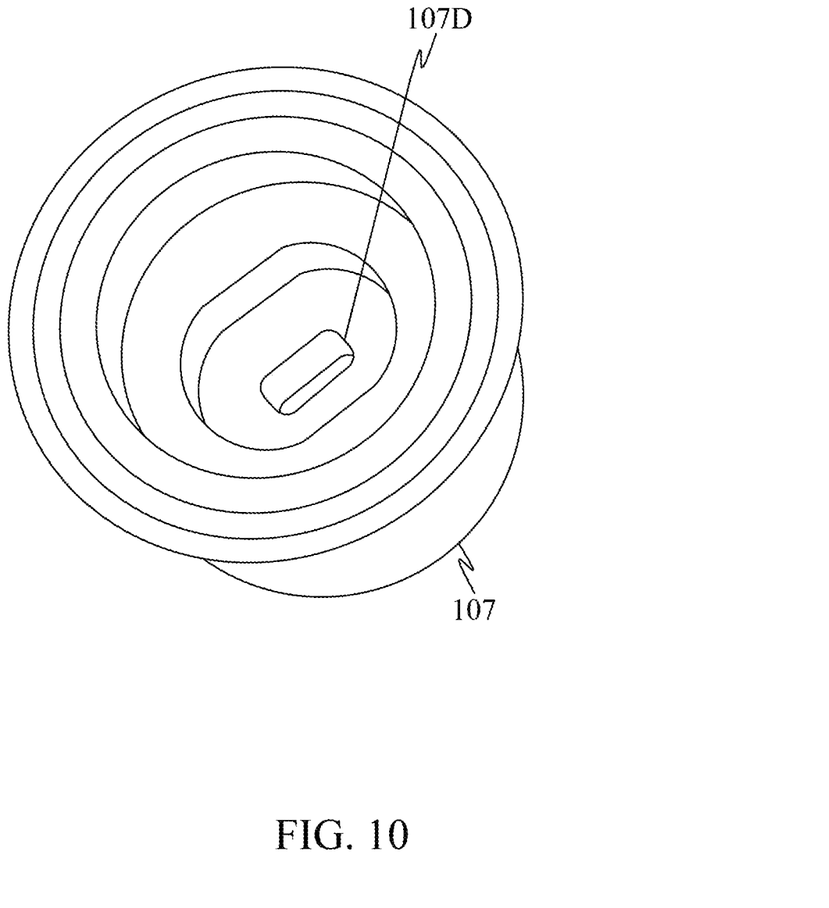
FIG. 10 is an inside view of end cap 107 valve in accordance with the present invention shown in FIG. 2.

Also shown in FIG. 9 is valve shaft rectangular end or key 105D. Valve shaft key 105D is adaptable to mate with rectangular slot 107D in end cap 107 shown in FIG. 10. It will be appreciated that when aerator 100 is fully assembled valve shaft rectangular end 105D fitted into slot 107D is unable to rotate.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

What is claimed is:

1. A sanitary high pressure aerator valve assembly comprising:
a main body having substantially coaxial opposite ends;
a coupling collar attachable to one end of the substantially coaxial opposite ends;
an end cap attachable to the end opposite of the coupling collar end;
an inlet adaptor attachable to the main body, wherein the inlet adaptor is substantially perpendicular to the substantially coaxial opposite ends;
an air chamber comprising a central passageway disposed between the inlet adaptor and the coupling collar end; and
an air isolation chamber, wherein the air isolation chamber comprises:
a wave spring; and
a plurality of bushings disposed on either end of the wave spring for compressing the wave spring.

2. The sanitary high pressure aerator valve assembly as in claim 1 further comprising:
a one-piece unitary piston member slidable for a predetermined distance within a portion of the central passageway coaxial with the main body coaxial ends and the air isolation chamber; and wherein the one-piece unitary piston member comprises:
an enlarged head disposed at one end of the one-piece unitary piston member for sealing the coupling collar end of the air chamber; and
a threaded end length disposed at an end opposite the enlarged head end and within the isolation chamber; and
wherein the threaded end is isolated from the central passageway by the air chamber isolation assembly.

3. The one-piece unitary piston member as in claim 2 wherein the one-piece unitary piston member further comprises a tension spring hole, wherein a location of the tension spring hole is predetermined as a function of the spring constant, air pressure, and the first predetermined distance.

4. The one-piece unitary piston member as in claim 3 wherein the first predetermined distance is 0.125 inches.

5. The one-piece unitary piston member as in claim 2 wherein the threaded end length is predetermined as a function of the spring constant, air pressure, and a second predetermined distance.

6. The one-piece unitary piston member as in claim 5 wherein the second predetermined distance is 0.093 inches.

7. The sanitary high pressure aerator valve as in claim 2 further comprising a spring tensioner for adjusting tension of the compression spring.

8. A high pressure aerator valve comprising:
a nose end having an internal air flow chamber;
a main body having an internal air flow chamber, wherein the nose end and the main body air flow chambers are mateable to provide a continuous air flow chamber through the main body and the nose end;
a rear body, mateable to the main body;
an end cap mateable to the rear body, wherein the end cap comprises an internal slot;
a wiper seal disposed between the main body and the rear body; and
wherein the rear body, end cap and wiper seal form an air isolation chamber isolated from the air flow chamber.

9. The air isolation chamber as in claim 8 further comprising:
at least one spring, the at least one spring comprising a spring constant; and
at least one tensioner for applying tension to the at least one spring.

10. The air isolation chamber as in claim 9, wherein the at least one tensioner comprises:
a spring tensioner;
a bushing; and
a washer disposed between the spring tensioner and the bushing.

11. The air isolation chamber as in claim 10 further comprising:
a one-piece unitary piston member slidable for a predetermined distance within a portion of air flow chamber and the air isolation chamber; and wherein the one-piece unitary piston member comprises:
an enlarged head disposed at one end of the one-piece unitary piston member for sealing a coupling collar end of the air chamber; and
a threaded end length disposed at an end opposite the enlarged head end and within the air isolation chamber.

12. The air isolation chamber as in claim 11 wherein the threaded end length is attachable to the spring tensioner.

13. The one-piece unitary piston member as in claim 11 wherein the threaded end length is predetermined as a function of the spring constant and air pressure.

14. The one-piece unitary piston member as in claim 11 wherein the one-piece unitary piston member further comprises a tension spring hole, wherein a location of the spring tension hole is predetermined as a function of the spring constant and air pressure.

15. The one-piece unitary piston member as in claim 11 further comprising a rectangular key, wherein the rectangular key is mateable with the internal slot.

* * * * *